US011950264B2

(12) United States Patent
Nam et al.

(10) Patent No.: US 11,950,264 B2
(45) Date of Patent: Apr. 2, 2024

(54) JOINT SOUNDING AND MEASUREMENT FOR ACCESS LINK AND SIDELINK

(71) Applicant: QUALCOMM Incorporated, San Diego, CA (US)

(72) Inventors: Wooseok Nam, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 16/943,417

(22) Filed: Jul. 30, 2020

(65) Prior Publication Data

US 2021/0037532 A1    Feb. 4, 2021

Related U.S. Application Data

(60) Provisional application No. 62/882,428, filed on Aug. 2, 2019.

(51) Int. Cl.
| | |
|---|---|
| *H04W 72/53* | (2023.01) |
| *H04B 7/06* | (2006.01) |
| *H04L 5/00* | (2006.01) |
| *H04L 25/02* | (2006.01) |
| *H04W 72/23* | (2023.01) |
| *H04W 92/18* | (2009.01) |

(52) U.S. Cl.
CPC .......... *H04W 72/53* (2023.01); *H04B 7/0626* (2013.01); *H04L 5/005* (2013.01); *H04L 25/0226* (2013.01); *H04W 72/23* (2023.01); *H04W 92/18* (2013.01)

(58) Field of Classification Search
None
See application file for complete search history.

(56) References Cited

U.S. PATENT DOCUMENTS

| | | | |
|---|---|---|---|
| 10,707,937 B2* | 7/2020 | Kim | ........................ H04B 7/06 |
| 11,388,026 B2* | 7/2022 | Yu | ........................ H04L 25/0226 |
| 2018/0234912 A1 | 8/2018 | Islam et al. | |

(Continued)

FOREIGN PATENT DOCUMENTS

| | | | |
|---|---|---|---|
| CN | 110086582 A | * | 8/2019 |
| EP | 3402105 A1 | | 11/2018 |
| WO | WO-2020021640 A1 | * | 1/2020 ........... H04L 5/0048 |

OTHER PUBLICATIONS

International Search Report and Written Opinion—PCT/US2020/044650—ISA/EPO—dated Nov. 3, 2020.

*Primary Examiner* — Jeffrey M Rutkowski
*Assistant Examiner* — Luna Weissberger
(74) *Attorney, Agent, or Firm* — ArentFox Schiff LLP

(57) ABSTRACT

In an aspect, the present disclosure includes a method, apparatus, and computer readable medium for wireless communications for configuring a Reference Signal (RS) resource set corresponding to a combination of a plurality of Access Link (AL) RSs and a plurality of Sidelink (SL) RSs; transmitting, jointly by the relay node and a network entity, the RS resource set to trigger a network to configure one or more Quasi-co-location (QCL) parameters for an AL and a relay SL; and communicating, by the relay node and the network entity, a downlink or uplink channel using the configured one or more QCL parameters for the AL and the relay SL.

29 Claims, 12 Drawing Sheets

(56) References Cited

U.S. PATENT DOCUMENTS

| | | |
|---|---|---|
| 2018/0331860 A1 | 11/2018 | Bergman et al. |
| 2019/0044677 A1 | 2/2019 | Ly |
| 2019/0281587 A1* | 9/2019 | Zhang .................. H04W 72/23 |
| 2019/0364590 A1* | 11/2019 | Sartori ................. H04W 72/23 |
| 2020/0053702 A1* | 2/2020 | Cheng ....................... H04L 1/08 |
| 2021/0266995 A1* | 8/2021 | Osawa ................. H04L 5/0048 |

* cited by examiner

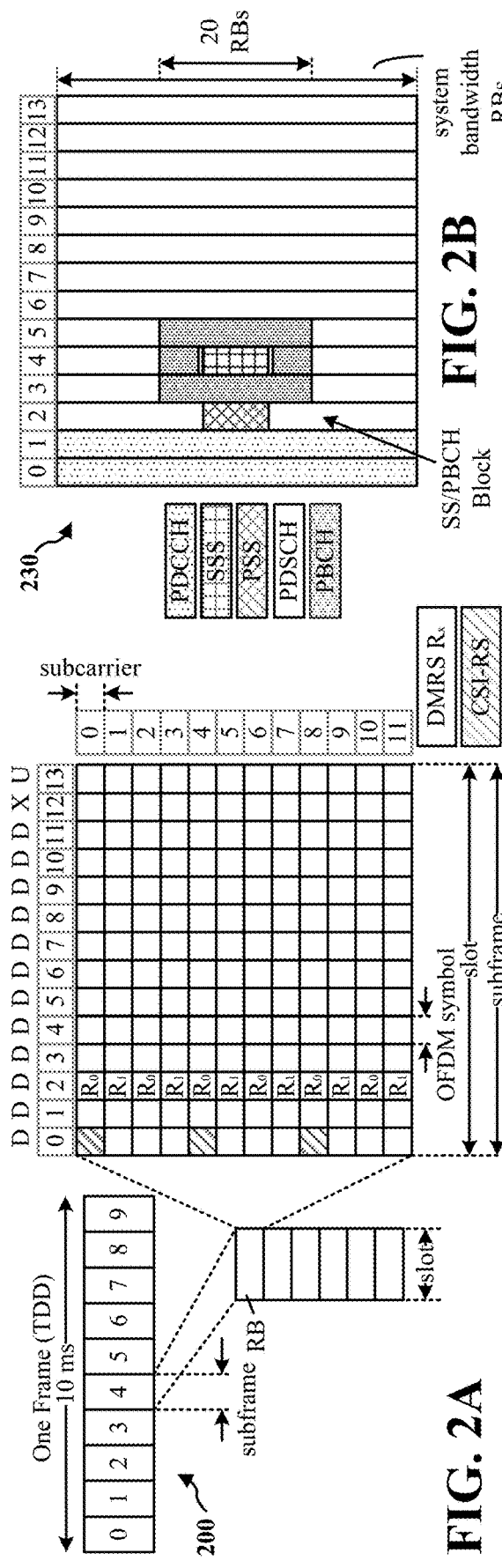
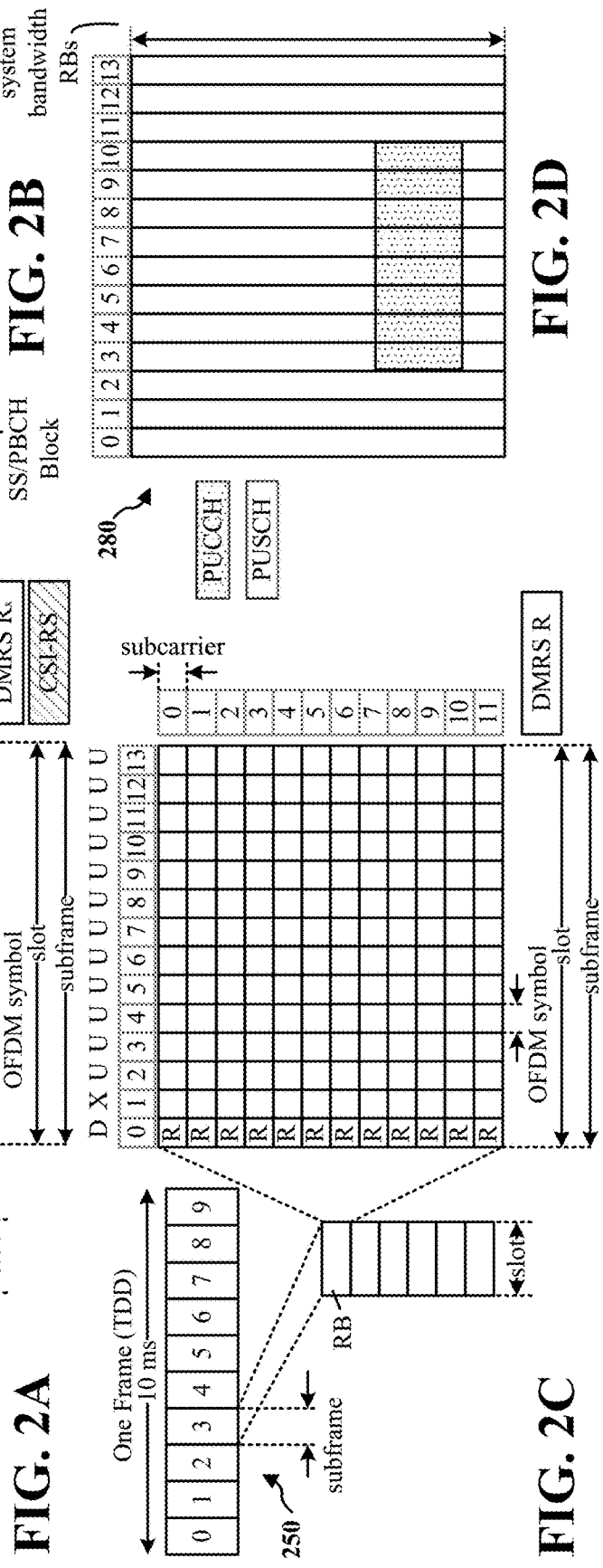

1000

1002

Configure a Reference Signal (RS) resource set corresponding to a combination of a plurality of Access Link (AL) RSs and a plurality of Sidelink (SL) RSs

1004

Transmit, jointly by the relay node and a network entity, the RS resource set to trigger a network to configure one or more Quasi-co-location (QCL) parameters for an AL and a relay SL

1006

Communicate, by the relay node and the network entity, a downlink or uplink channel using the configured one or more QCL parameters for the AL and the relay SL

FIG. 10

JOINT SOUNDING AND MEASUREMENT FOR ACCESS LINK AND SIDELINK

CROSS-REFERENCE TO RELATED APPLICATION(S)

The present application claims benefit of U.S. Provisional Application No. 62/882,428 entitled "JOINT SOUNDING AND MEASUREMENT FOR ACCESS LINK AND SIDELINK" filed Aug. 2, 2019, and is assigned to the assignee hereof and hereby expressly incorporated by reference herein.

BACKGROUND

Technical Field

The present disclosure relates generally to communication systems, and more particularly, to joint configuration of channel sounding and measurement.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some wireless communication networks include device-to-device (D2D) communication such as, but not limited to, vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. In such systems, the synchronization mechanism (e.g., timing and/or frequency synchronization) for a user equipment (UE) may be based on a connection to a global navigation satellite system (GNSS) or a cellular base station. Alternatively, in absence of a connection with a GNSS or base station, the synchronization for a UE may require sidelink synchronization with another UE that is already synchronized to a GNSS or base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes configuring a Reference Signal (RS) resource set corresponding to a combination of a plurality of Access Link (AL) RSs and a plurality of Sidelink (SL) RSs; transmitting, jointly by the relay node and a network entity, the RS resource set to trigger a network to configure one or more Quasi-co-location (QCL) parameters for an AL and a relay SL; and communicating, by the relay node and the network entity, a downlink or uplink channel using the configured one or more QCL parameters for the AL and the relay SL.

In a further example, an apparatus for wireless communication is provided that includes a transceiver, a memory configured to store instructions, and one or more processors communicatively coupled with the transceiver and the memory. The aspect may include the one or more processors being configured execute instructions to configure a RS resource set corresponding to a combination of a plurality of AL RSs and a plurality of SL RSs; transmit, jointly by the relay node and a network entity, the RS resource set to trigger a network to configure one or more QCL parameters for an AL and a relay SL; and communicate, by the relay node and the network entity, a downlink or uplink channel using the configured one or more QCL parameters for the AL and the relay SL.

In another aspect, an apparatus for wireless communication is provided that includes means for configuring a RS resource set corresponding to a combination of a plurality of AL RSs and a plurality of SL RSs; means for transmitting, jointly by the relay node and a network entity, the RS resource set to trigger a network to configure one or more QCL parameters for an AL and a relay SL; and means for communicating, by the relay node and the network entity, a downlink or uplink channel using the configured one or more QCL parameters for the AL and the relay SL.

In yet another aspect, a non-transitory computer-readable medium is provided including one or more processor executing code for configuring a RS resource set corresponding to a combination of a plurality of AL RSs and a plurality of SL RSs; code for transmitting, jointly by the relay node and a network entity, the RS resource set to trigger a network to configure one or more QCL parameters for an AL and a relay SL; and code for communicating, by the relay node and the network entity, a downlink or uplink channel using the configured one or more QCL parameters for the AL and the relay SL.

In another example, a method for wireless communication includes configuring, by a relay node, a RS resource set corresponding to a combination of a plurality of AL RSs and a plurality of SL RSs; transmitting, by the relay node, the RS resource set to trigger a network to configure one or more QCL parameters for an AL and a relay SL; and communicating, by the relay node with a network entity, a downlink or uplink channel using the configured one or more QCL parameters for the AL and the relay SL.

In a further example, an apparatus for wireless communication is provided that includes a transceiver, a memory configured to store instructions, and one or more processors communicatively coupled with the transceiver and the memory. The aspect may include the one or more processors being configured execute instructions to configure, by a relay node, a RS resource set corresponding to a combination of a plurality of AL RSs and a plurality of SL RSs; transmit, by the relay node, the RS resource set to trigger a network to configure one or more QCL parameters for an AL and a relay SL; and communicate, by the relay node with a network entity, a downlink or uplink channel using the configured one or more QCL parameters for the AL and the relay SL.

In another aspect, an apparatus for wireless communication is provided that includes means for configuring, by a relay node, a RS resource set corresponding to a combination of a plurality of AL RSs and a plurality of SL RSs; means for transmitting, by the relay node, the RS resource set to trigger a network to configure one or more QCL parameters for an AL and a relay SL; and means for communicating, by the relay node with a network entity, a downlink or uplink channel using the configured one or more QCL parameters for the AL and the relay SL.

In yet another aspect, a non-transitory computer-readable medium is provided including one or more processor executing code for configuring, by a relay node, a RS resource set corresponding to a combination of a plurality of AL RSs and a plurality of SL RSs; code for transmitting, by the relay node, the RS resource set to trigger a network to configure one or more QCL parameters for an AL and a relay SL; and code for communicating, by the relay node with a network entity, a downlink or uplink channel using the configured one or more QCL parameters for the AL and the relay SL.

In another example, a method for wireless communication includes configuring, by a network entity, a RS resource set corresponding to a combination of a plurality of AL RSs and a plurality of SL RSs; transmitting, by the network entity, the RS resource set to trigger a network to configure one or more QCL parameters for an AL and a relay SL; and communicating, by the network entity with a relay node, a downlink or uplink channel using the configured one or more QCL parameters for the AL and the relay SL.

In a further example, an apparatus for wireless communication is provided that includes a transceiver, a memory configured to store instructions, and one or more processors communicatively coupled with the transceiver and the memory. The aspect may include the one or more processors being configured execute instructions to configure, by a network entity, a RS resource set corresponding to a combination of a plurality of AL RSs and a plurality of SL RSs; transmit, by the network entity, the RS resource set to trigger a network to configure one or more QCL parameters for an AL and a relay SL; and communicate, by the network entity with a relay node, a downlink or uplink channel using the configured one or more QCL parameters for the AL and the relay SL.

In another aspect, an apparatus for wireless communication is provided that includes means for configuring, by a network entity, a RS resource set corresponding to a combination of a plurality of AL RSs and a plurality of SL RSs; means for transmitting, by the network entity, the RS resource set to trigger a network to configure one or more QCL parameters for an AL and a relay SL; and means for communicating, by the network entity with a relay node, a downlink or uplink channel using the configured one or more QCL parameters for the AL and the relay SL.

In yet another aspect, a non-transitory computer-readable medium is provided including one or more processor executing code for configuring, by a network entity, a RS resource set corresponding to a combination of a plurality of AL RSs and a plurality of SL RSs; code for transmitting, by the network entity, the RS resource set to trigger a network to configure one or more QCL parameters for an AL and a relay SL; and code for communicating, by the network entity with a relay node, a downlink or uplink channel using the configured one or more QCL parameters for the AL and the relay SL.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 10 is a flowchart of a method of wireless communication of a UE communicating sidelink capability information.

DETAILED DESCRIPTION

Figure 1:
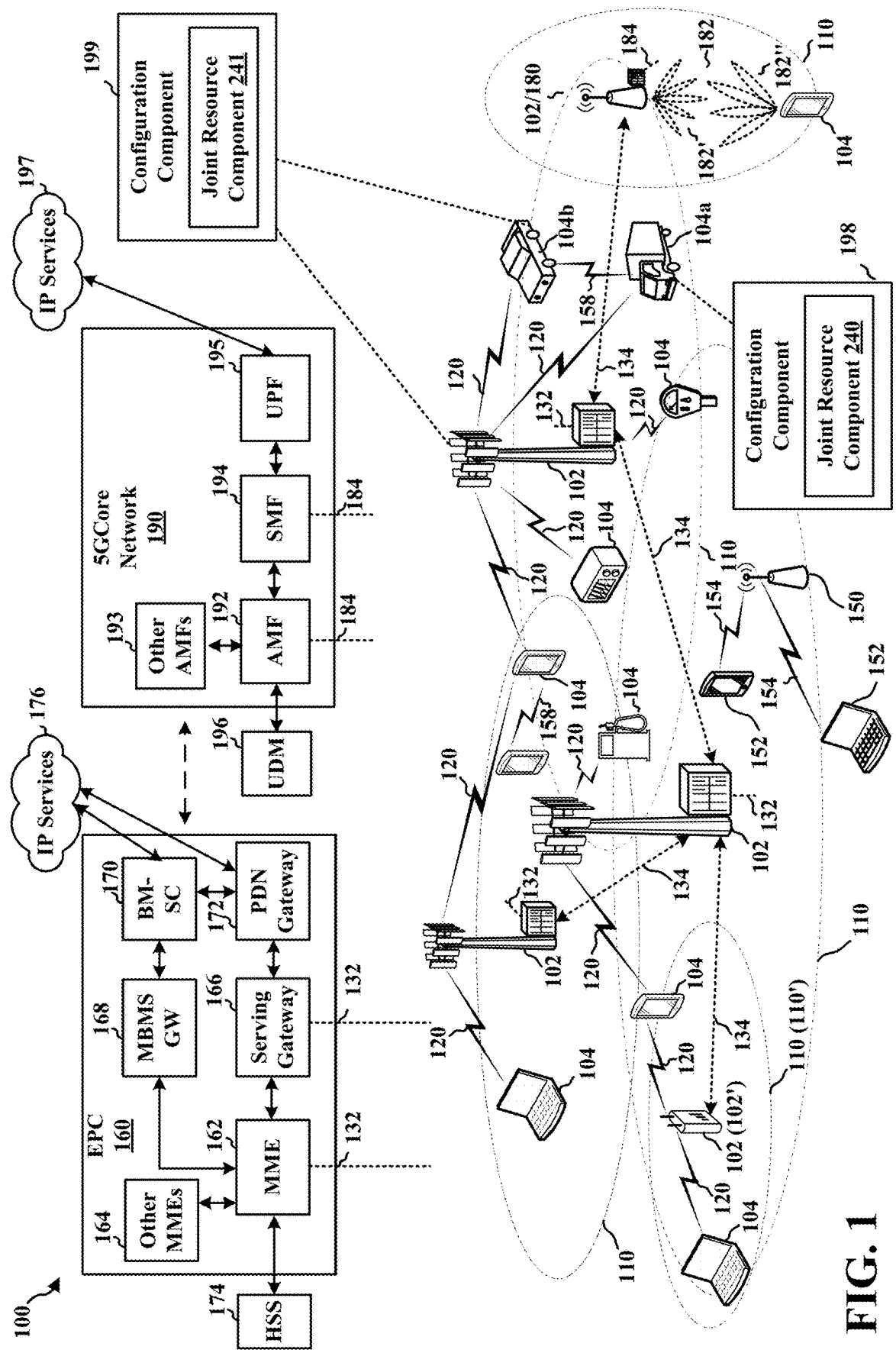
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may be configured to operate configuration component 198 to transmit a Reference Signal (RS) resource set to a network entity 102. Correspondingly, in certain aspects, the network entity 102 (e.g., base station) may be configured to operate configuration component 199 to receive the RS resource set from the UE 104. As noted, secondary UEs 104a (e.g., relay nodes), may configure a RS resource set corresponding to a combination of a plurality of Access Link (AL) RSs and a plurality of Sidelink (SL) RSs. The UE 104 and the network entity 102 may joint transmit the RS resource set to trigger a network to configure one or more Quasi-co-location (QCL) parameters for an AL and a relay SL; and communicate a downlink or uplink channel using the configured one or more QCL parameters for the AL and the relay SL.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 110 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, and the UEs 104a/b, described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$. 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
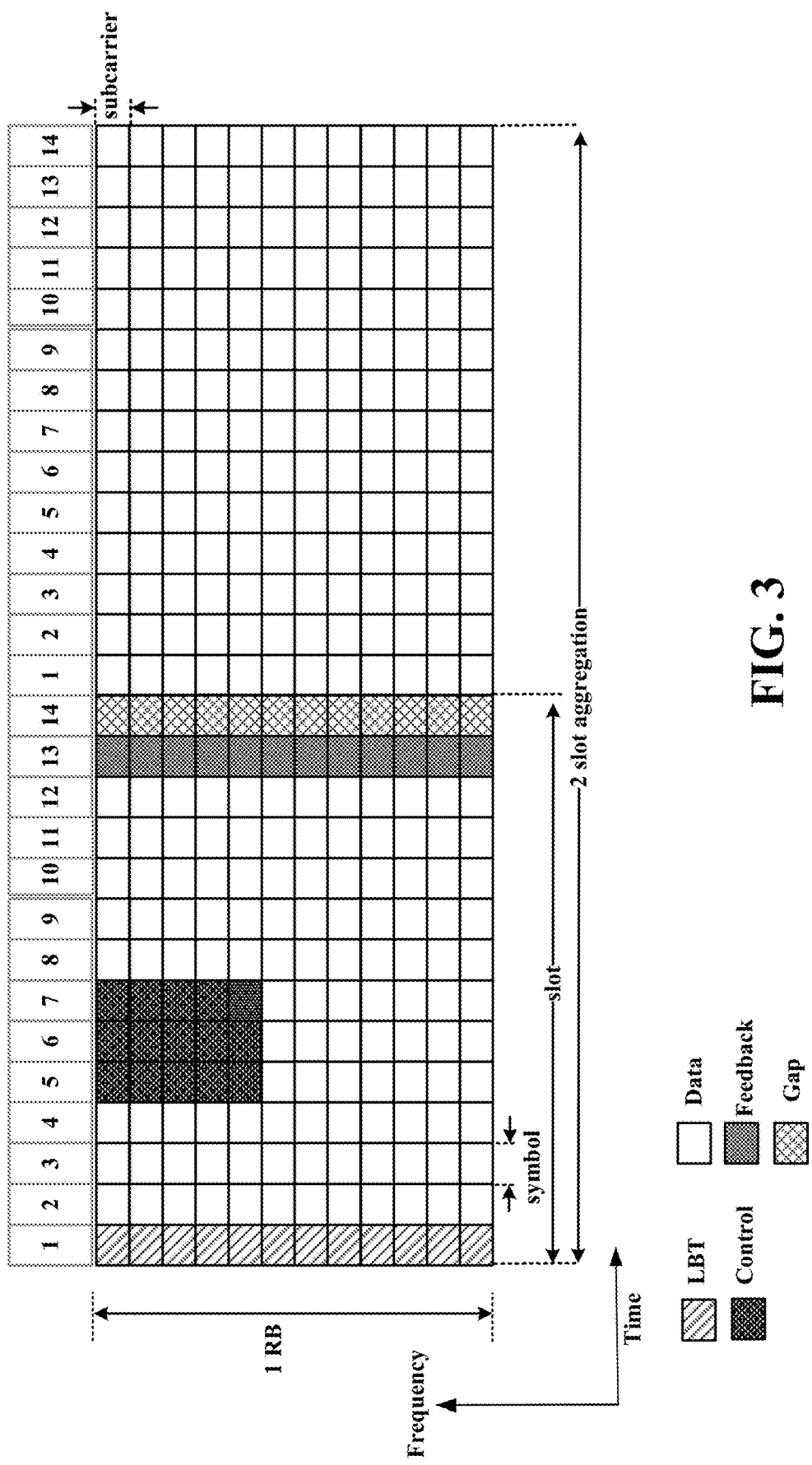
FIG. 3 is a diagram illustrating a frame structure and resources for sidelink communications.

FIG. 3 is a diagram 290 of an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Some of the REs may comprise control information, e.g., along with demodulation RS (DM-RS). The control information may comprise Sidelink Control Information (SCI). In some implementations, at least one symbol at the beginning of a slot may be used by a transmitting device to perform a Listen Before Talk (LBT) operation prior to transmitting. In some implementations, at least one symbol may be used for feedback, as described herein. In some implementations, another symbol, e.g., at the end of the slot, may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. In some implementations, multiple slots may be aggregated together, and the example aggregation of two slots in FIG. 3 should not be considered limiting, as the aggregated number of slots may also be larger than two. When slots are aggregated, the symbols used for feedback and/or a gap symbol may be different that for a single slot.

Figure 4:
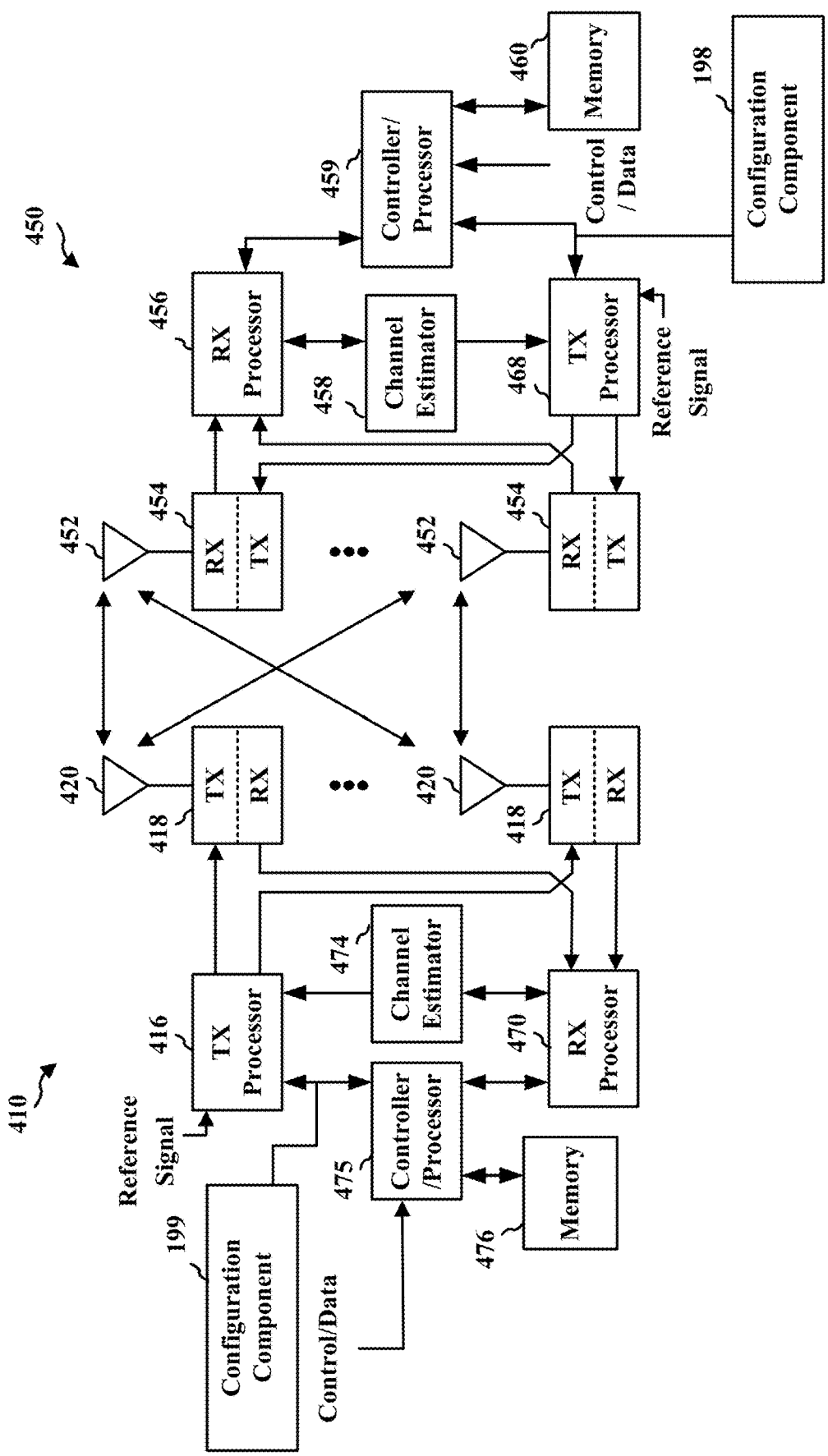
FIG. 4 is a diagram illustrating an example of a base station and user equipment (UE) in an access network.

FIG. 4 is a block diagram of a base station 410 in communication with a UE 450 in an access network, where the base station 410 may be an example implementation of base station 102 and where UE 450 may be an example implementation of UE 104. In the DL, IP packets from the EPC 160 may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

At least one of the TX processor 468, the RX processor 456, and the controller/processor 459 may be configured to perform aspects in connection with 198 of FIG. 1.

At least one of the TX processor 416, the RX processor 470, and the controller/processor 475 may be configured to perform aspects in connection with 199 of FIG. 1.

Figure 5:
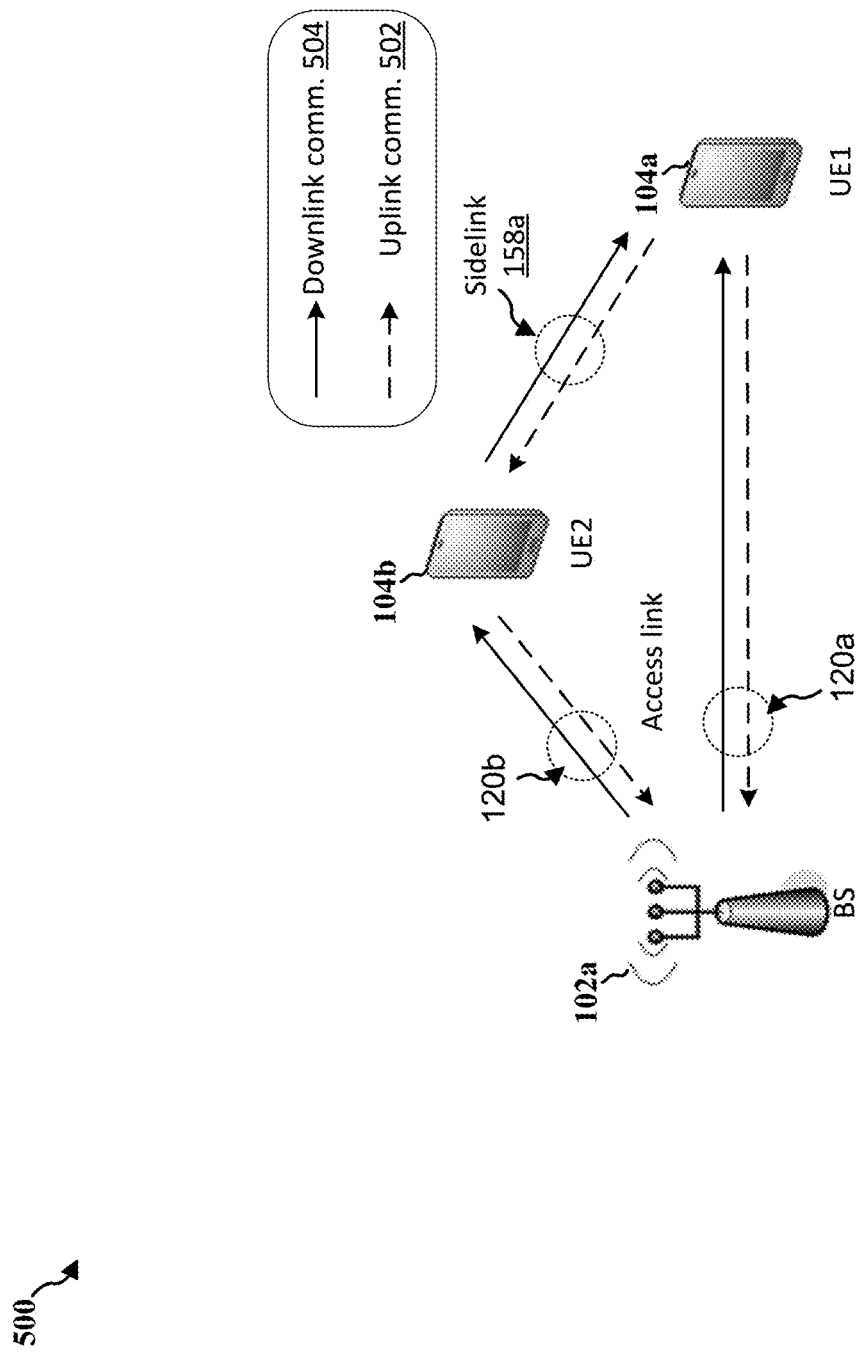
FIG. 5 is a diagram illustrating an example of communicating sidelink capability information between a UE and one or more network entities.
Figure 6:
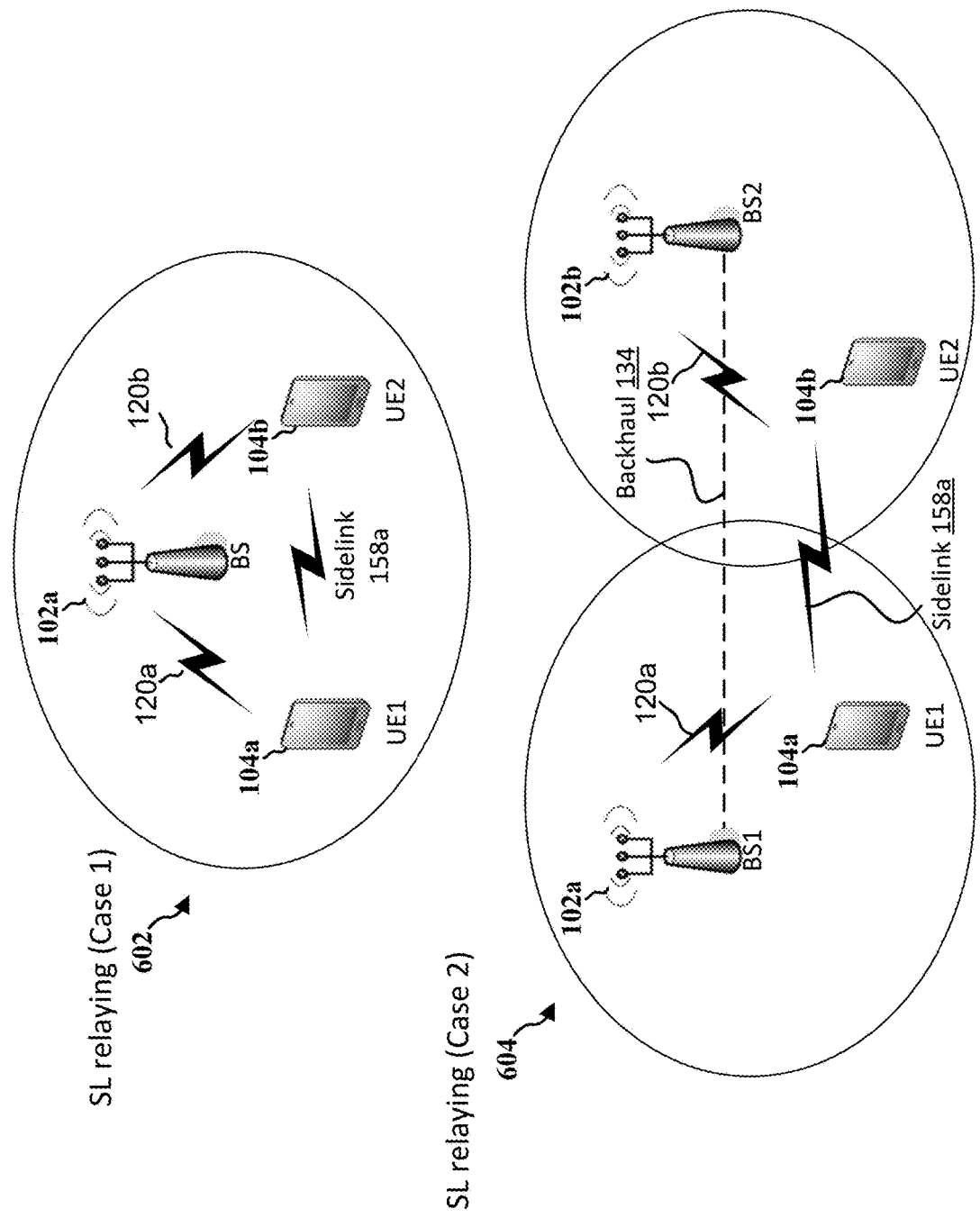
FIG. 6 is a diagram illustrating an example of at least two UEs communicating via a sidelink.

Referring to FIGS. 5 and 6, the present aspects generally relate to a sidelink relay communication scenario 500, 602, and/or 604 that includes relaying communications over a sidelink. As mentioned above, sidelink communication generally includes any type of device-to-device (D2D) communication. D2D communications may be used in applications such as, but not limited to, vehicle-to-anything (V2X) or vehicle to any other device type of communications, sensor networks, public safety-related communication services with limited infrastructure availability, or any other such type of application.

In the sidelink relay communication scenario 500, 602, and/or 604, a sidelink-assisted multi-link UE 104a may establish a multi-link communication with one or more base stations 102a and/or 102b over two or more communication links, which include at least one direct link and at least one indirect link via a sidelink with a relay UE 104b. In a first case, such as in the sidelink relay communication scenarios 500 and 602, the sidelink-assisted multi-link UE 104a directly communicates with the base station 102a via a first access link (AL) 120a, and indirectly communicates with the base station 102a via a sidelink 158a with the relay UE 104b, which has a second access link 120b with the base station 102a. In general, an access link such as access link 120a or 120b is a communication link between a respective UE and a respective base station (or gNB), which may also be referred to as a Uu interface in 4G LTE and/or in 5G NR technologies. In general, the sidelink 158a is a communication link between UEs, which may be referred to as a PC5 interface in 4G LTE and/or in 5G NR technologies. In any case, the sidelink relay communication scenario 500, 602, and/or 604 may be utilized for improved diversity, e.g., sending the same data over two links (access link and sidelink), and/or improved throughput, e.g., sending different, independent data over each link. In an implementation, in a mmW system, this type of multi-link communication may be attained using multiple transmit/receive beams and multiple antenna panels (sub-arrays) between the UEs and/or between a respective UE and a respective base station/gNB.

Further, in a second case, such as in the sidelink relay communication scenario 604, the sidelink-assisted multi-link UE 104a may establish multiple links with multiple base stations 102a and 102b, which may be referred to as a multi-transmit-receive point (multi-TRP) architecture. In this case, the sidelink-assisted multi-link UE 104a directly communicates with the base station 102a via a first access link (AL) 120a, and indirectly communicates with the base station 102b via a sidelink 158a with the relay UE 104b, which has a second access link 120b with the base station 102b. Additionally, in this case, the base stations 102a and 102b may exchange communications over a backhaul link 134a.

Additionally, in the sidelink relay communication scenario 500, 602, and/or 604, the communications exchanged between the base station 102a/102b, relay UE 104b, and sidelink-assisted multi-link UE 104a may be uplink (UL) communications 502 and/or downlink (DL) communications 504 (see FIG. 5).

Figure 7:
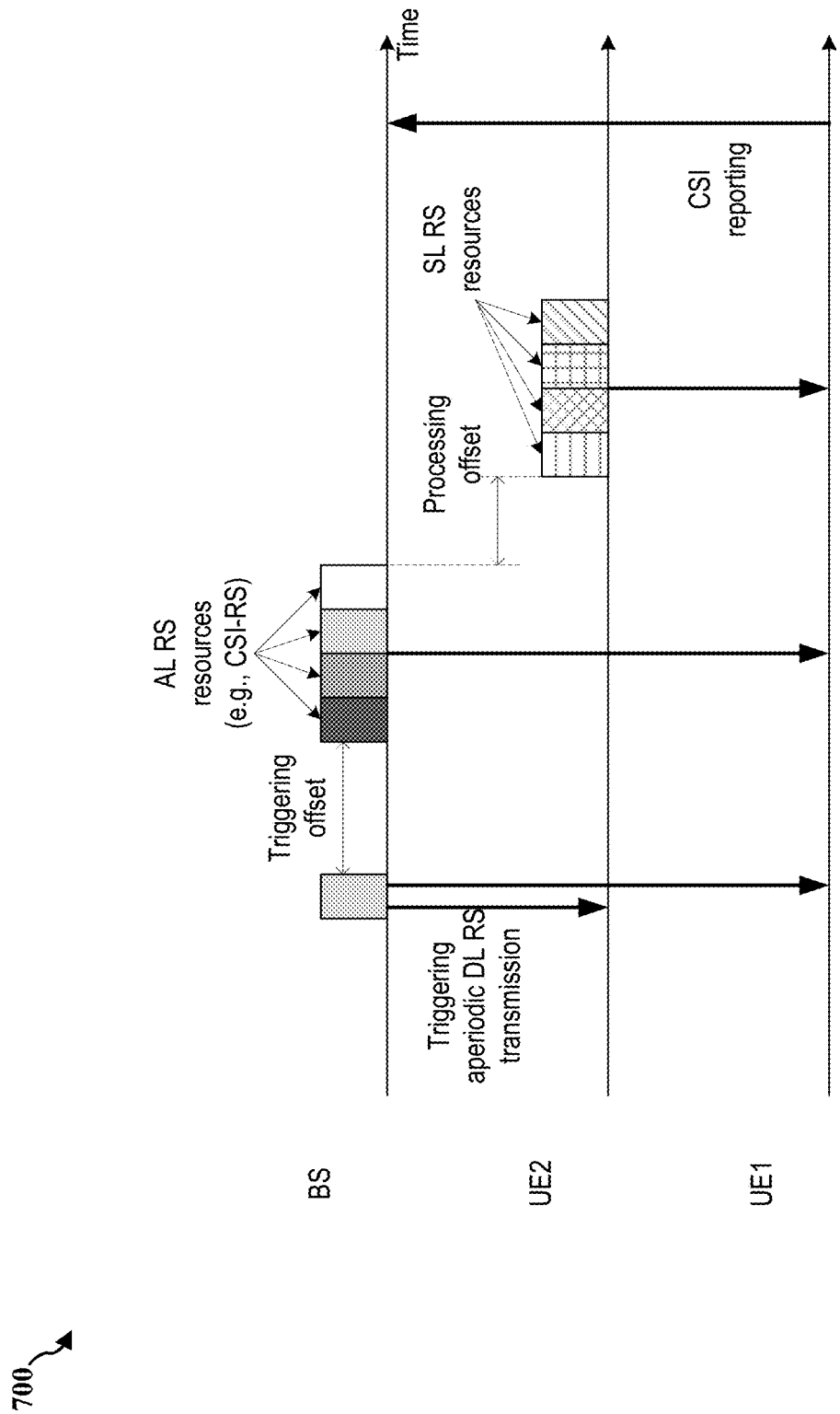
FIG. 7 is a diagram illustrating an example of aperiodic downlink sounding between at least two UEs communicating via a sidelink.
Figure 8:
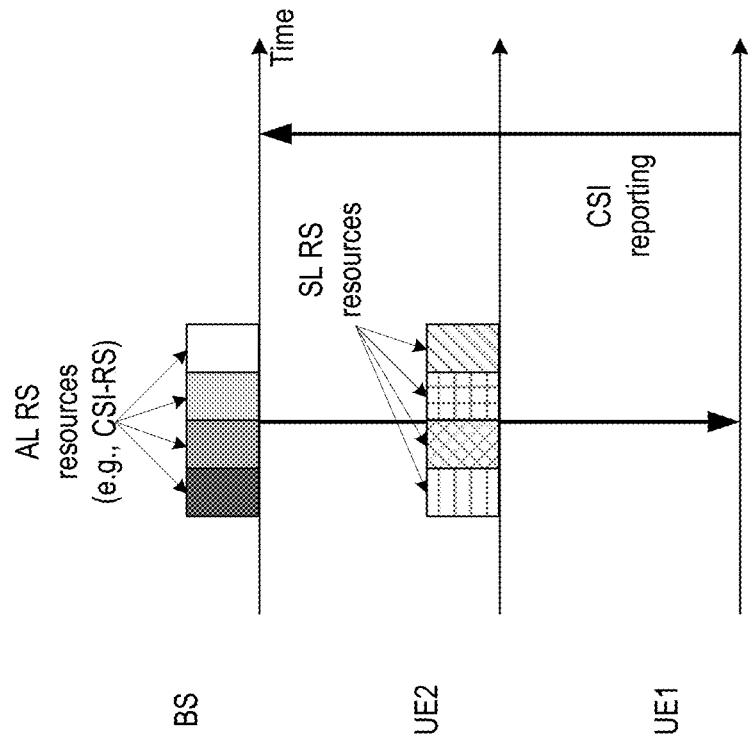
FIG. 8 is a diagram illustrating an example of downlink sounding with simultaneous RS transmission between at least two UEs communicating via a sidelink.
Figure 9:
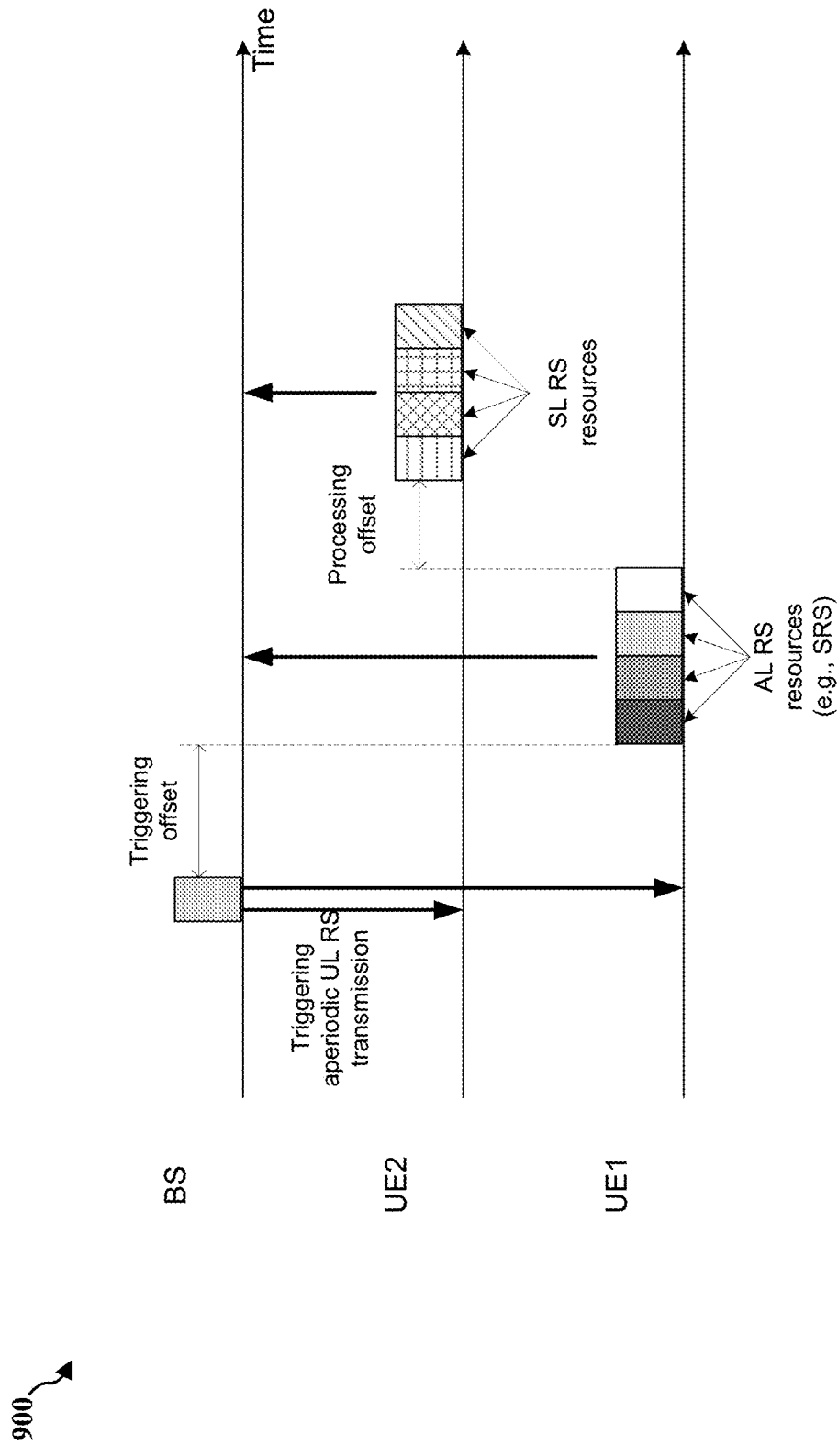
FIG. 9 is a diagram illustrating an example aperiodic uplink sounding between at least two UEs communicating via a sidelink.

Referring to FIGS. 7, 8, and 9, the present aspects generally relate to a sidelink relay communication scenario 700, 800, and 900 that includes relaying communications over a sidelink. As mentioned above, sidelink communication generally includes any type of device-to-device (D2D) communication. D2D communications may be used in applications such as, but not limited to, vehicle-to-anything (V2X) or vehicle to any other device type of communications, sensor networks, public safety-related communication services with limited infrastructure availability, or any other such type of application.

In sidelink relay communication scenario 700, the base station may transmit an indication to trigger aperiodic DL RS transmissions to UE1 and UE2. In an aspect, after the transmission of the indication, a triggering offset may occur in which a period of time passes between AL RS resources (e.g., CSI-RS) are transmitted to UE1.

In some aspects, a processing offset occurs between the transmission of the AL RS resources and the SL RS resources. The SL RS resources may be transmitted from UE2 to UE1. As a result of receiving the SL RS resources, UE1 may transmit CSI reporting to base station.

In sidelink relay communication scenario 800, the base station may transmit the AL RS resources (e.g., CSI-RS) while UE2 simultaneously transmits the SL RS resources to UE1. As a result of receiving these transmissions, UE1 may transmit CSI reporting to the base station. Accordingly, sidelink relay communication scenario 800 illustrates downlink sounding with simultaneous RS transmission.

In sidelink relay communication scenario 900, the base station may transmit an indication that triggers aperiodic UL RS transmission to each of UE1 and UE2. Upon receiving the indication, UE1 may wait a period of time corresponding to the triggering offset before transmitting an AL RS resources (e.g., SRS) to the base station. UE2 may wait a processing offset after the AL RS resources before transmitting SL RS resources to the base station. Accordingly, sidelink relay communication scenario 900 illustrates aperiodic uplink sounding.

Referring to FIG. 10, an example method 1000 of wireless communication may be performed by the relay UE 104b.

At 1002, method 1000 includes configuring a Reference Signal (RS) resource set corresponding to a combination of a plurality of Access Link (AL) RSs and a plurality of Sidelink (SL) RSs.

At 1004, method 1000 includes transmitting, jointly by the relay node and a network entity, the RS resource set to trigger a network to configure one or more Quasi-co-location (QCL) parameters for an AL and a relay SL.

At 1006, method 1000 includes communicating, by the relay node and the network entity, a downlink or uplink channel using the configured one or more QCL parameters for the AL and the relay SL.

In some implementations of method 1000, a RS resource in the RS resource set is associated with at least one of an AL or SL node index and at least one of an AL or SL RS resource index associated with the node.

In some implementations of method 1000, the plurality of SL RSs are combined with a plurality of Channel State Information Reference Signal (CSI-RS) resources as the AL RSs for downlink sounding.

In some implementations of method 1000, the plurality of SL RSs are combined with a plurality of Sounding Reference Signal (SRS) resources as the AL RSs for uplink sounding.

In some implementations of method 1000, communicating a downlink or uplink channel using the configured one or more QCL parameters for the AL and the relay SL further comprises triggering a transmission of a configured RS resource set with a processing offset between each transmission of the plurality of AL RSs and the plurality of SL RSs associated with the RS resource set.

In some implementations of method 1000, communicating a downlink or uplink channel using the configured one or more QCL parameters for the AL and the relay SL further comprises triggering a transmission of the plurality of AL RSs and the plurality of SL RSs associated with the configured RS resource set without a processing offset in between or simultaneously over different panels.

In some implementations of method 1000, the one or more QCL parameters correspond to at least one of joint Transmission Configuration Indicator (TCI) states communicating on the downlink or joint spatial relation for communicating on the uplink.

Figure 11:
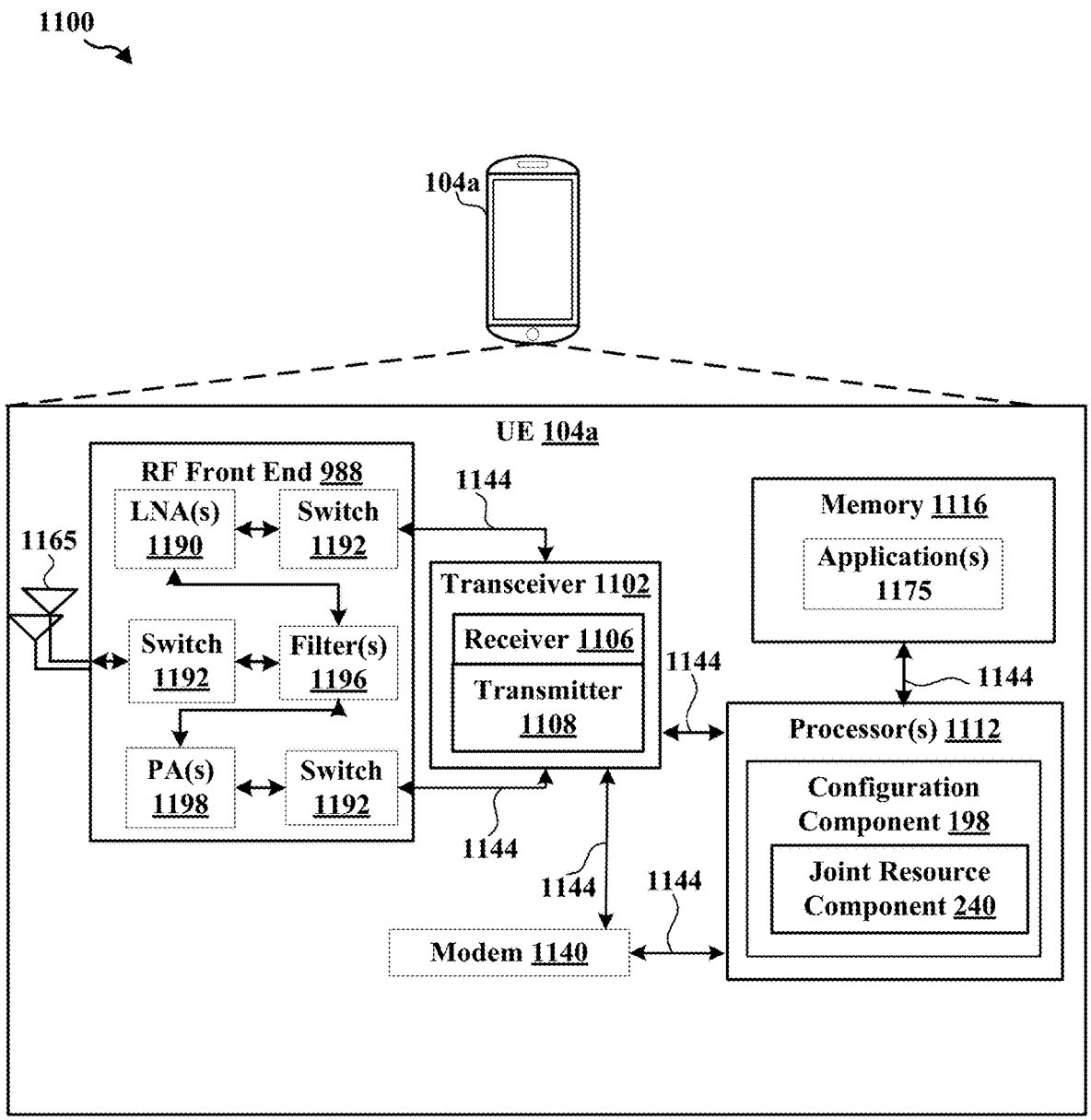
FIG. 11 is a block diagram illustrating an example of a UE, in accordance with various aspects of the present disclosure.

Referring to FIG. 11, one example of an implementation of UE 104a may include a variety of components, some of which have already been described above and are described further herein, including components such as one or more processors 1112 and memory 1116 and transceiver 1102 in communication via one or more buses 1144, which may operate in conjunction with modem 1140 and/or configuration component 198 for communicating sidelink capability information.

In an aspect, the one or more processors 1112 can include a modem 1140 and/or can be part of the modem 1140 that uses one or more modem processors. Thus, the various functions related to configuration component 198 may be included in modem 1140 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 1140 associated with configuration component 198 may be performed by transceiver 1102.

Also, memory 1116 may be configured to store data used herein and/or local versions of applications 1175 or communicating component 1142 and/or one or more of its subcomponents being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining configuration component 198 and/or one or more of its subcomponents, and/or data associated therewith, when UE 104a is operating at least one processor 1112 to execute configuration component 198 and/or one or more of its subcomponents.

Transceiver 1102 may include at least one receiver 1106 and at least one transmitter 1108. Receiver 1106 may include hardware and/or software executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one base station 102. Additionally, receiver 1106 may process such received signals, and also may obtain measurements of the signals, such as, but not limited to, Ec/Io, signal-to-noise ratio (SNR), reference signal received power (RSRP), received signal strength indicator (RSSI), etc. Transmitter 1108 may include hardware and/or software executable by a processor for transmitting data, the code comprising instructions and being stored in a memory (e.g., computer-readable medium). A suitable example of transmitter 1108 may including, but is not limited to, an RF transmitter.

Moreover, in an aspect, UE 104 may include RF front end 1188, which may operate in communication with one or more antennas 1165 and transceiver 1102 for receiving and transmitting radio transmissions, for example, wireless communications transmitted by at least one base station 102 or wireless transmissions transmitted by UE 104. RF front end 1188 may be connected to one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, LNA 1190 can amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 can be used by RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, RF front end 1188 can use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 1165 via RF front end 1188. In an aspect, transceiver may be tuned to operate at specified frequencies such that UE 104 can communicate with, for example, one or more base stations 102 or one or more cells associated with one or more base stations 102. In an aspect, for example, modem 1140 can configure transceiver 1102 to operate at a specified frequency and power level based on the UE configuration of the UE 104*a* and the communication protocol used by modem 1140.

In an aspect, modem 1140 can be a multiband-multimode modem, which can process digital data and communicate with transceiver 1102 such that the digital data is sent and received using transceiver 1102. In an aspect, modem 1140 can be multiband and be configured to support multiple frequency bands for a specific communications protocol. In an aspect, modem 1140 can be multimode and be configured to support multiple operating networks and communications protocols. In an aspect, modem 1140 can control one or more components of UE 104*a* (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104*a* as provided by the network during cell selection and/or cell reselection.

In an aspect, communicating component 1142 can optionally include mode determining component 1152. For example, upon receiving an anchor signal in an initial bandwidth portion from a network entity 102, the anchor signal triggering an initial access procedure for the UE 104*a*, mode determining component 1152 may determine whether to operate in a wideband OFDM mode or a wideband SC-FDM mode in response to receiving the anchor signal. Communicating component 1142 may then transmit a capability report message to the network entity 102 based on the determination by the mode determining component 1152 of whether to operate in the wideband OFDM mode or the wideband SC-FDM mode In an aspect, the processor(s) 1112 may correspond to one or more of the processors described in connection with the UE in FIG. 4. Similarly, the memory 1116 may correspond to the memory described in connection with the UE in FIG. 4.

Figure 12:
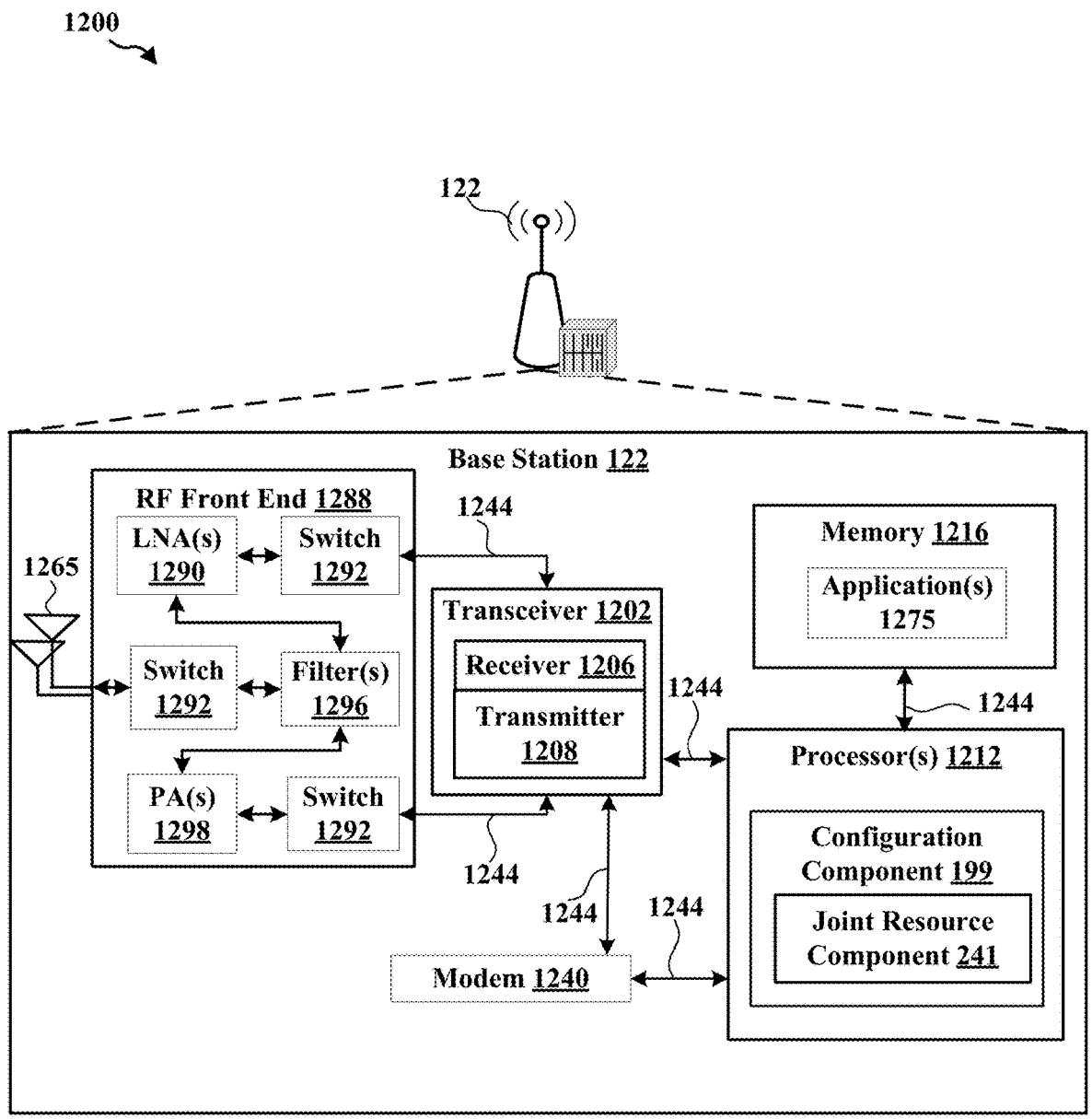
FIG. 12 is a block diagram illustrating an example of a base station, in accordance with various aspects of the present disclosure.

Referring to FIG. 12, one example of an implementation of base station 122 (e.g., a base station 122, as described above) may include a variety of components, some of which have already been described above, but including components such as one or more processors 1212 and memory 1216 and transceiver 1202 in communication via one or more buses 1244, which may operate in conjunction with modem 1240 and configuration component 199 for communicating sidelink capability information.

The transceiver 1202, receiver 1206, transmitter 1208, one or more processors 1212, memory 1216, applications 1275, buses 1244, RF front end 1288, LNAs 1290, switches 1292, filters 1296, PAs 1298, and one or more antennas 1265 may be the same as or similar to the corresponding components of UE 124, as described above, but configured or otherwise programmed for base station operations as opposed to UE operations.

In an aspect, the processor(s) 1212 may correspond to one or more of the processors described in connection with the base station in FIG. 4. Similarly, the memory 1216 may correspond to the memory described in connection with the base station in FIG. 4.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of communication, comprising:
configuring, by a relay node, a Reference Signal (RS) resource set that associates first resources with second resources, wherein the first resources are scheduled for communication, by or to a network entity, of at least one Access Link (AL) RS, and wherein the second resources are scheduled for transmission, by the relay node, of at least one Sidelink (SL) RS;
transmitting, by the relay node and to a user equipment (UE), the at least one SL RS over the second resources to trigger a network to configure one or more Quasi-co-location (QCL) parameters for an AL and a relay SL with the UE, wherein the one or more QCL parameters correspond to a joint spatial relation between the network entity and the relay node; and
communicating, by the relay node, at least one of a downlink channel or an uplink channel using the one or more QCL parameters for the relay SL.

2. The method of claim 1, wherein at least one of the first resources or the second resources in the RS resource set is associated with at least one of an AL or SL node index and at least one of an AL or SL RS resource index associated with the relay node.

3. The method of claim 1, wherein the at least one SL RS is associated with a Channel State Information Reference Signal (CSI-RS) communicated by the network entity as the at least one AL RS for downlink sounding.

4. The method of claim 1, wherein the at least one SL RS is associated with Sounding Reference Signal (SRS) communicated to the network entity as the at least one AL RS for uplink sounding.

5. The method of claim 1, wherein the at least one SL RS includes a set of multiple SL RSs and the at least one AL RS includes a set of multiple AL RSs each having the first resources associated with the second resources of one of the SL RSs in the set of multiple SL RSs, and wherein transmitting the at least one SL RS associated with the at least one AL RS comprises transmitting the set of multiple SL RSs with a processing offset between the set of multiple SL RSs and the set of multiple AL RSs.

6. The method of claim 1, wherein the at least one SL RS includes a set of multiple SL RSs and the at least one AL RS includes a set of multiple AL RSs each having the first resources associated with the second resources of one of the SL RSs in the set of multiple SL RSs, and wherein transmitting the at least one SL RS associated with the at least one AL RS comprises transmitting the set of multiple SL RSs without a processing offset between the set of multiple SL RSs and the set of multiple AL RSs or simultaneously over different panels.

7. The method of claim 1, wherein the one or more QCL parameters further correspond to a joint Transmission Configuration Indicator (TCI) state for communicating on the downlink channel.

8. The method of claim 7, wherein the joint TCI state triggers aperiodic uplink RS transmissions between at least two user equipments (UEs).

9. A method of communication, comprising:
configuring, by a user equipment (UE), a Reference Signal (RS) resource set that associates first resources with second resources, wherein the first resources are scheduled for communication, by or to a network entity, of at least one Access Link (AL) RS, and wherein the second resources are scheduled for transmission, by a relay node, of at least one Sidelink (SL) RS;
transmitting, by the UE, channel state information (CSI) feedback, based on the at least one AL RS received from the network entity over the first resources and the at least one SL RS received over the second resources from the relay node, to trigger a network to configure one or more Quasi-co-location (QCL) parameters for an AL and a relay SL, wherein the one or more QCL parameters correspond to a joint spatial relation between the network entity and the relay node; and
communicating, with at least one of the relay node or the network entity, a downlink channel or an uplink channel using the one or more QCL parameters for the AL or the relay SL.

10. The method of claim 9, wherein at least one of the first resources or the second resources in the RS resource set is associated with at least one of an AL or SL node index and at least one of an AL or SL RS resource index associated with the relay node.

11. The method of claim 9, wherein the at least one SL RS is associated with a Channel State Information Reference Signal (CSI-RS) as the at least one AL RS for downlink sounding.

12. The method of claim 9, wherein the at least one SL RS includes a set of multiple SL RSs and the at least one AL RS includes a set of multiple AL RSs each having the first resources associated with the second resources of one of the SL RSs in the set of multiple SL RSs, and further comprising receiving the set of multiple RSs with a processing offset between the set of multiple SL RSs and the set of multiple AL RSs.

13. The method of claim 9, wherein the at least one SL RS includes a set of multiple SL RSs and the at least one AL RS includes a set of multiple AL RSs each having the first resources associated with the second resources of one of the SL RSs in the set of multiple SL RSs, and further comprising receiving the set of multiple RSs without a processing offset between the set of multiple SL RSs and the set of multiple AL RSs or simultaneously over different panels.

14. The method of claim 9, wherein the one or more QCL parameters further correspond to a joint Transmission Configuration Indicator (TCI) state for communicating on the downlink channel.

15. A method of communication, comprising:
configuring, by a network entity, a Reference Signal (RS) resource set that associates first resources with second resources, wherein the first resources are scheduled for communication, by or to the network entity, of at least one Access Link (AL) RS, and wherein the second resources are scheduled for transmission, by a relay node, of at least one Sidelink (SL) RS;
transmitting, by the network entity and to a user equipment (UE) and the relay node, the at least one AL RS over the first resources to trigger a network to configure one or more Quasi-co-location (QCL) parameters for an AL and a relay SL with the UE, wherein the one or more QCL parameters correspond to a joint spatial relation between the network entity and the relay node; and
communicating, by the network entity, at least one of a downlink channel or an uplink channel using the one or more QCL parameters for the AL.

16. The method of claim 15, wherein at least one of the first resources or the second resources in the RS resource set is associated with at least one of an AL or SL node index and at least one of an AL or SL RS resource index associated with the relay node.

17. The method of claim 15, wherein the at least one SL RS is associated with a Channel State Information Reference Signal (CSI-RS) as the at least one AL RS for downlink sounding.

18. The method of claim 15, wherein the at least one SL RS is associated with a Sounding Reference Signal (SRS) as the at least one AL RS for uplink sounding.

19. The method of claim 15, wherein the at least one SL RS includes a set of multiple SL RSs and the at least one AL RS includes a set of multiple AL RSs each having the first resources associated with the second resources of one of the SL RSs in the set of multiple SL RSs, and wherein transmitting the at least one SL RS associated with the at least one AL RS comprises transmitting the set of multiple SL RSs with a processing offset between the set of multiple SL RSs and the set of multiple AL RSs.

20. The method of claim 15, wherein the at least one SL RS includes a set of multiple SL RSs and the at least one AL RS includes a set of multiple AL RSs each the first resources associated with the second resources of one of the SL RSs in the set of multiple SL RSs, and wherein transmitting the at least one SL RS associated with the at least one AL RS comprises transmitting the set of multiple SL RSs without a processing offset between the set of multiple SL RSs and the set of multiple AL RSs or simultaneously over different panels.

21. The method of claim 15, wherein the one or more QCL parameters further correspond to a joint Transmission Configuration Indicator (TCI) state for communicating on the downlink channel.

22. An apparatus for communication, comprising:
one or more memories configured to store instructions; and
one or more processors communicatively coupled with the one or more memories, wherein the one or more processors are configured to execute the instructions to:
configure a Reference Signal (RS) resource set that associates first resources with second resources, wherein the first resources are scheduled for communication, by or to a network entity, of at least one Access Link (AL) RS, and wherein the second resources are scheduled for transmission, by the apparatus, of at least one Sidelink (SL) RS;
transmit, by a relay node or network entity, and to a user equipment (UE), the at least one SL RS over the second resources to trigger a network to configure one or more Quasi-co-location (QCL) parameters for an AL and a relay SL with the UE, wherein the one or more QCL parameters correspond to a joint spatial relation between the network entity and the apparatus; and
communicate at least one of a downlink channel or an uplink channel using the one or more QCL parameters for the relay SL.

23. The apparatus of claim 22, wherein at least one of the first resources or the second resources in the RS resource set is associated with at least one of an AL or SL node index and at least one of an AL or SL RS resource index associated with the apparatus.

24. The apparatus of claim 22, wherein the at least one SL RS is associated with a Channel State Information Reference Signal (CSI-RS) as the at least one AL RS for downlink sounding.

25. The apparatus of claim 22, wherein the at least one SL RS is associated with a Sounding Reference Signal (SRS) as the at least one AL RS for uplink sounding.

26. The apparatus of claim 22, wherein the at least one SL RS includes a set of multiple SL RSs and the at least one AL RS includes a set of multiple AL RSs each having the first resources associated with the second resources of one of the SL RSs in the set of multiple SL RSs, and wherein the one or more processors are configured to transmit the at least one SL RS associated with the AL RS with a processing offset between the set of multiple SL RSs and the set of multiple AL RSs.

27. The apparatus of claim 22, wherein the at least one SL RS includes a set of multiple SL RSs and the at least one AL RS includes a set of multiple AL RSs each having the first resources associated with the second resources of one of the SL RSs in the set of multiple SL RSs, and wherein the one or more processors are configured to transmit the at least one SL RS associated with the AL RS without a processing offset between the set of multiple SL RSs and the set of multiple AL RSs or simultaneously over different panels.

28. The apparatus of claim 22, wherein the one or more QCL parameters further correspond a joint Transmission Configuration Indicator (TCI) state for communicating on the downlink channel.

29. The apparatus of claim 28, wherein the joint TCI state triggers aperiodic uplink RS transmissions between at least two user equipments (UEs).

\* \* \* \* \*